US007302442B2

(12) United States Patent
Sampson et al.

(10) Patent No.: US 7,302,442 B2
(45) Date of Patent: Nov. 27, 2007

(54) METHOD FOR RECORDING, IDENTIFICATION, SELECTION, AND REPORTING NETWORK TRANSVERSAL PATHS

(75) Inventors: Wesley C. Sampson, Sylvania, OH (US); Dean Douthat, Sylvania, OH (US)

(73) Assignee: Data Pattern Index, Sylvania, OH (US)

( * ) Notice: Subject to any disclaimer, the term of this patent is extended or adjusted under 35 U.S.C. 154(b) by 31 days.

(21) Appl. No.: 11/142,942

(22) Filed: Jun. 2, 2005

(65) Prior Publication Data

US 2006/0277161 A1 Dec. 7, 2006

(51) Int. Cl.
*G06F 7/00* (2006.01)
*G06F 17/00* (2006.01)

(52) U.S. Cl. .................................................. 707/101
(58) Field of Classification Search ............... 707/6, 707/2, 101
See application file for complete search history.

(56) References Cited

U.S. PATENT DOCUMENTS

| 5,212,639 | A | | 5/1993 | Sampson et al. | |
|---|---|---|---|---|---|
| 5,390,113 | A | | 2/1995 | Sampson | |
| 5,557,742 | A | | 9/1996 | Smaha et al. | |
| 6,058,392 | A | * | 5/2000 | Sampson et al. | ............... 707/6 |
| 2005/0091540 | A1 | * | 4/2005 | Dick et al. | ................... 713/201 |

OTHER PUBLICATIONS

Luke Hohmann, Getting Started with Patterns, Software Development, Feb. 1998 (pp. 55-61).
Wesley C. Sampson & Michael J. Olan, An Innovation in Auditing, Matrix Summaries of Journal Entires, Abacus, vol. 28, No. 2, Sep. 1992 (pp. 133-141).
J. Nievergelt & H. Hinterberger, The Grid File: An Adaptable, Symmetric Multikey File Structure, ACM Transactions on Database Systems, vol. 9, No. 1, Mar. 1984 (pp. 38-71).
V.Y. Lum, Mulit-Attribute Retrieval with Combined Indexes, Communications of the ACM, vol. 13, No. 11, Nov. 1970 (pp. 660-665).
Wesley C. Sampson, Transaction Index: A Tool for Auditors, Internal Auding, Spring 1996 (pp. 16-24).
Ralph Kimball & Kevin Strehlo, Why Decision Support Fails and How to Fix it, Datamation, Jun. 1, 1994 (pp. 40-45).
Matrix Auditors Users Manual. pp. 1-10.
Sparse Sort Users Manual pp. 1-13.

* cited by examiner

*Primary Examiner*—Jeffrey Gaffin
*Assistant Examiner*—Michael J Hicks
(74) *Attorney, Agent, or Firm*—Daniel A. Rosenberg; Briggs and Morgan, P.A.

(57) ABSTRACT

The present invention comprises a computerized method for indexing information through the use of a general-purpose computer in operative communication with a data stream. A data stream is read, wherein the data represents one or more transitions within one or more episodes. A signature is created for each of the episodes within the data stream, wherein the signature is a representation of the transitions. The steps are repeated for each of the episodes in the data stream. An index is created comprised of the signatures.

14 Claims, 3 Drawing Sheets

Master List

| Path Location/URL | Sequence Number | Caption |
|---|---|---|
| | | |

Canonical Record

| Episode ID | User ID | Transition ID | Elapsed Time |
|---|---|---|---|
| | | | |

Combination Cross Reference File

| Transition ID | Signature | Related Data |
|---|---|---|
| | | |

Sequence ID Flow
Sequence ID = (Source Sequence No.)(Constant) + Destination Sequence No.

METHOD FOR RECORDING, IDENTIFICATION, SELECTION, AND REPORTING NETWORK TRANSVERSAL PATHS

BACKGROUND OF THE INVENTION

1. Field of the Invention

The present invention relates a method for indexing information. In particular, the invention comprises a computerized method of reading information from a data stream, creating a one or more signatures that are a representations of transitions within an episode, and organizing the signatures into one or more indices for later use in computerized information searches.

2. Background

Many enterprises generate large volumes of information for computerized storage, retrieval, and analysis. Generally, a computer reads the information, or data entries, from a data stream record by record. Each record contains a varying number of items of information. A particular record can contain one item, or several hundred or more individual items. The records, therefore, not only vary in length, but the individual items can vary in length. Usually, the computerized management of data involves storage of the data on a mass storage device like a magnetic disk. This allows later retrieval of the data for analysis. An organization can collect a huge amount of information very quickly; therefore, timely and accurate retrieval of the data requires a good indexing system.

Prior art indices are described as primary vs. secondary, where primary indices are ordered by the same key as the file but secondary indices refer to a different attribute of the file record. A dense index identifies every record of the file whereas a sparse index identifies logical sections. A single-level index points directly to the location of the content whereas a multi-level index accommodates further subdivision of the index at each level, the final level pointing to the location of the content. Static indices are not changed in the normal operation whereas dynamic indices are expected to be altered while an operation is in execution. Regardless of the method of index, the target of the index reference is always one specific item. That one specific item may be a specific record, the first occurrence of a specific value of a given field, the disk sector on which the data is found, or something else of a singular definition. The target is usually defined on (directed to the index from) individual field(s) of a single record.

Nievergelt, Hinterburger and Sevcik (ACM Transactions on Database Systems, March, 1984) surveyed combinatorial indices. However, their work covered multi-attribute combinations and disclaimed the study of multiple values of a single data attribute in an index.

Additionally, U.S. Pat. No. 5,212,639 shows a method and electronic apparatus for the classification of combinatorial data for the summarization and/or tabulation thereof. The apparatus and the method create a database wherein the data entry, such as a journal entry in accounting, comprises the canonical record. A plurality of data entries to be classified are separate records, each comprised of one or more items having associated quantities and an entry identifier serving as a pointer to the record. Each item contains information including at least an item number, or label, and a quantity. A mapping function is applied to each data entry to assign item indicators for the item numbers paired with the associated quantities. The item indicators for the data entries are sorted into ascending numerical sequence and an n-dimension sparse matrix is selected where "n" is the number of items in the data entry. If the present combination of item indicators is new, a design record is created for the database based upon the sparse matrix and including the item indicators, the associated quantity sums, the total number of data entries summarized in the design record and a pointer (a chain of entry identifiers) to the records of the data entry detail. The quantities for the present data entry are added to the quantity sums and the entry identifier is stored in the pointer chain. After all the data entries have been processed, a search routine can be utilized to review the various design records as desired.

This reference while representing a substantial advancement, however, does not teach the utilization of a key number representing the total number of key fields, or items, in the data entry record groups. By utilizing a key number, it is possible to, for example, minimize the amount of memory needed to ultimately store the information. Additionally, the reference teaches the use of pointers chains to navigate through the index. Pointer chains eventually breakdown when dealing with very large amounts of data. With large amounts of data the size of the pointer chain grows to an excessive level, and stepping through a very long pointer chain requires significant amount of processing time. Further, when the pointer chains become large they require a large amount of Random Access Memory storage, which places further demands on the computer system and computer processing time. Also, the pointer chains requiring updating and storage each time a new record is added to the chain. Again with the growth in the size of the pointer chains, this increases system processing time. Furthermore, pointer chains can make error recovery difficult; if one link in the pointer chain fails then processing stops and must resume at the beginning of the pointer chain. Furthermore, the reference teaches separately processing variable length data entry record groups. The reference teaches the maintenance of separate pointer chains for each variable length data entry record group. Thus, all the data entry record groups comprised of two items require separate processing from the data entry record groups comprised of three items. Consequently, the method taught by the reference is more effective when implemented to audit existing fixed length data, rather than to perform real-time management of variable length data.

Furthermore, U.S. Pat. No. 5,390,113 shows a method and electronic apparatus for electronically performing bookkeeping upon a plurality of pre-existing accounting journal entries having at least one account number and at least one data component associated with each account number. First, a chart of accounts having account numbers and opening balances associated with the plurality of journal entries is read electronically. A set of account-section numbers is then created for each account number. The journal entries are electronically read individually and one of the account-section numbers is assigned to each account number. The assigned account-section numbers and associated data components are then sorted in a predetermined order. A design for the predetermined order is identified and compared with stored design records to see if such a design already exists. If not, the new design is stored. If so, the associated data components are added to the accumulated total for each account-section number. A tally representing the number of journal entries summarized is increased by one and an entry identifier is added to a list of data entry record groups. The process is then repeated for each journal entry. This reference also fails to teach the utilization of a key number representing the total number of key fields in the data entry records group. The key number allows for quickly identifying data entry record groups of common size. Without the key number, sorting requires traversing all of the design records regardless of their size. Further, this reference also relies extensively on pointer chains, and requires separate processing for each variably sized data entry record group. Accordingly, the teachings of the reference are more effective when implemented to perform bookkeeping of existing data rather than to perform real-time management of variable length data.

Moreover, U.S. patent application Ser. No. 08/751,74, now abandoned, teaches a method and apparatus for the classification of raw data based on the creation of an index. The method comprises reading a data entry record group from a plurality of data entry record groups, where the data entry record group comprises at least one data entry record with at least one key field containing an item. The method further comprises tallying a key number representing a total number of key fields in the data entry record group, creating an index record having a predetermined number of one or more key fields equal to the key number, mapping each item in the key fields of the data entry record groups to generate an item indicator in each of the key fields of the index record, and determining whether each of the item indicators in each of the key fields of the index record exists in a stored index record. If the item indicators in each of the key fields of the index record do not exist in the stored index record, the item indicators are added to the index record along with a pointer enabling location of the data entry records group, and the index record is stored. If the item indicators in each of the key fields of the index record exist in the stored index record, a pointer scheme related to the stored index record is altered to enable location of the data entry record groups. This method again relies on pointer chains to traverse the variable length index records, and of course, suffers from the other aforementioned difficulties. Additionally, this method also requires a key number to allow quick identification of variable size records. Thus, each variable length group of records requires a separate indexing system. Accordingly, the teachings of this reference operate more effectively when implemented upon smaller data sets.

U.S. Pat. No. 6,058,392 teaches a computerized method of organizational indexing, storage, and retrieval of computerized representations of events in the form of data, by creating signatures based upon the occurrence of patterns within the data. The method involves creating data entry record groups from events, where the data entry record groups comprises one of more items. The items are encoded to into fixed length binary equivalent item indicators, and are then used to create a signature which is a fixed length coded equivalent of the data entry record group. Various indices are created including a partial index record, and combination cross-reference index. While representing a substantial improvement over the prior art, this method is not ideally suited to the problem created by network path traversals. U.S. Pat. No. 6,058,392 has a preference for sorting the information records that can remove important information regarding the order of the networks, which can be quite important in the network path application. Furthermore, the '392 patent does not teach certain aspects of data organization necessary and/or helpful to indexing network path transversals.

Accordingly, a need exists for an improved method of indexing information for use by computerized information searches.

SUMMARY OF THE INVENTION

An object of the present invention comprise providing an improved method of indexing information for use by computerized information searches.

These and other objects of the present invention will become apparent to those skilled in the art upon reference to the following specification, drawings, and claims.

The present invention intends to overcome the difficulties encountered heretofore. To that end, a computerized method for indexing network path traversal information is provided, which comprises, a general-purpose computer in operative communication with a data stream for performing the steps of the method. Data is read from a data stream. A transition record is created wherein the record is a representation of movement between two points of the network. The method repeats for a plurality of transition records that represent at least one episode in the data stream. A network path transversal information index is created therefrom.

DETAILED DESCRIPTION OF THE INVENTION

Many networks exist for which knowledge of the specific path per user episode is useful, wherein an episode is defined as the sequence of events, occurrences, or steps undertaken by a user/object over a particular or defined period of time, or for a particular or defined purpose.

One example of such network data is found in transportation, where most operational information and reporting pertains to the transfer of persons or goods from one point to another: e.g., aircraft flight or truck shipment. An aircraft itinerary or truck freight 'pro' invoice identifies the path of the person or goods through the network. In this situation the network path is already recorded but must be identified for future selection and reporting.

Other networks, such as hosted webs on the Internet, or computer processed neural networks, produce data that emphasizes the pages or points of the network. The path through the network must be constructed from the available information and then identified, selected and reported. Another important type of network contemplated by the present invention are communication networks such as landline and wireless telephone communication networks. A point of distinction between these types of networks is that while the call is ongoing the communication circuit is open and complete. Thus, an intact log of the network path traversal can be stored/processed intact for each episode. The episode is identified and recorded, as a group of adjacent transitional records, there would be no need to sort the records to order the transitions by network path travel or by users. This is not the case with many networks, due to the fact that there may be many simultaneous users, or the path is not fully known until after the episode is complete.

Computer Network Path Information

Communications network information is similar to computer network log information in that each sending site reports a target switch. A necessary step in computer network path analysis is creation of a controlled vocabulary of possible transitions, defined as user movements from one page or point in the network to another page or point. For example, aircraft flight numbers and truck freight numbers are components of controlled vocabularies of their organizations. These transitions, representing travel points through the network, can be represented in a log of activity, comprised of one or more network log entries. Each entry in the log could include all kinds of information, however, for present purposes of tracking, indexing, and retrieval of transitions, certain information is necessary. For illustrative purposes, the following example relates to the network path analysis of Internet activity; however, those of ordinary skill will understand that the invention in not so limited. The information, for the chosen example, includes an identifier to identify the episodic activity such as the complete URL of the user's Internet address, the URL accessed by the user, and the time of entry or access of the URL by the user. The basic log entry for the Internet path analysis study can be represented as follows.

| Web Log Entry | | |
|---|---|---|
| User Address | URL Accessed | Time of Access |

In practice, network transversal data could consist of the simultaneous recordation of the activities of several users all accessing different parts of a network, or system of networks. Thus, some presorting may need to take place in order to group together the activity of each user. In this case, the data should be sorted by user IP address, which results in all records of a particular user being written in time sequence. The task is now to process the path decisions made by each user.

The basic Web Log entry shown above comprises one entry capturing the location of one point along the network path chosen by a specific user or object. A subsequent Web Log entry would capture the next point along the network chosen by the user. The combination of the two points comprises a transition. In other words, a transition is the movement from one point to another point along a network path. The entire record of activity, or series of transitions, defines an episode of network path activity. Thus, the basic entry log of an episode consists of a list of web pages visited by a specific user (including an exit). This information can be compiled and processed to facilitate large scale indexing, storage, and retrieval of the information. The URL accessed, which comprises a location point in a network, is normally stored in an unadulterated form and in a short form as a caption. In practice, considering the web path example, the URL address can be quite long. This may be the case for other network applications as well. Thus, for display and other purposes it is helpful to reduce the length by creating a unique abbreviated caption for each URL that appears in the Web Log. As stated, the shift from one page to its follower is termed a transition, which is captured by two entries in the Web Log. The complete list of Web Log entries from the beginning of a particular user's activity to the end of the activity comprises an episode. Each episode is given a unique identifier that is associated with each transition within the episode. Thus, for indexing and search purposes, certain episode information should be captured in order to preserve path information for each transition of an episode. The basic form of the record of this information is deemed a Transition Record.

| Transition Record | | | |
|---|---|---|---|
| Episode ID | From URL | To URL | Elapsed Time |

The above record of a transition includes an Episode ID identifying the episode, a From URL indicating the beginning point of a transition, a To URL indicating the ending point of the transition, and an elapsed time between transition points. Each transition creates a similar record. The transition records are compiled from the first transition in the episode, until the last transition. The final transition record preferably results when the user exits from the web, and would consist of the exit transition record. In the absence of a user initiated exit transition record, one may be produced via comparison of elapsed time. If more than an arbitrary amount of time elapses after a transition begins by selection of a from page, an end of episode is assumed. Only when a final transition record is recorded in the log can one be certain that all the transitions in an episode are accounted for.

The Canonical Record

From the above information, a canonical record can be constructed. The canonical record is the basic or fundamental information recorded or preserved from a transaction, which forms the basis of the system of indexing and searching/information retrieval described in further detail hereinbelow. The canonical record is formed from the information records described hereinabove.

As described, the essential information for recording the path through a network comprises a user identification, and a representation of movement from one location to the next. Other information can be included as well, like the time between movements, and the location in electronic storage of the first transition of an episode.

As noted previously, the From and To URLs are stored in a long and short form. The From/To URLs can be further reduced to a Transition ID comprised of a single binary numeric value through the use of a positional algorithm. This algorithm operates on a Sequence Number that is assigned to each Path Location/URL and stored in a Master List. As each URL is encountered it is assigned a unique Sequence Number. Preferably, Sequence Numbers progress in numeric order from first URL to the last URL. The positional algorithm proceeds by replacing each URL with its Sequence Number. The From URL Sequence Number is multiplied by a very large constant. The To URL Sequence Number is added to the product to create the Transition ID. These multiplication and addition operations can actually be performed using binary logic operations. Retrieval of the From/To URL Sequence Numbers can be achieved by dividing the Transition ID by the large constant. The integer portion is the From URL Sequence Number, and the remainder is the To URL Sequence Number. This operation can also be performed using binary logic. Other schemes for reducing the From and to Page numbers to a single number are possible, as well.

Thus, the canonical record preferably has the following fields, however, those of ordinary skill in the art will understand that the critical field for evaluating the path traveled through the a network is the Transition ID.

| Canonical Record | | | |
|---|---|---|---|
| Episode ID | User ID | Transition ID | Elapsed Time |

The method for translation of the sorted Web Log into canonical records includes preserving the electronic storage location of the raw data information used to create the first canonical record. This only occurs once per episode. Otherwise, the first field of the canonical record contains the Episode Id, which distinguishes between episodes. A User ID (preferably an IP Address) can be recorded. Also, an arbitrary elapsed time to signal end of episode termination should be determined. The elapsed time is determined between form the From and To page movements by selecting consecutive movements of a user, and then subtracting the time spent between movements. The method further includes creating the Transition ID using the aforementioned positional algorithm. Also, the date can be preserved, as well as other material not considered here. The process is repeated until a canonical record is created for each transition in an episode, and the episode is terminated in some fashion. Each episode is therefore recorded into a series of canonical records, each record comprising a single transition within the episode. The process further repeats for a plurality of users, over an indefinite period of term to create the multi-episode path summary log file.

The set of transition records defines user decisions or paths sequentially through one episode, or series of episodes. These transitions may be identified by the combination of transitions executed, which can be termed a signature; and an index of that combination/signature may be constructed. Note, however, that web visitors often duplicate their traversals within one episode and otherwise alter there usage sequence in a manner which is a permutation within the combination of transitions indexed. For example, a user may travel back and forth between the same two URL's, or web pages, several times. Preferably, these permutations can be preserved in the canonical record, and such information may prove useful to consider; however, this information need not be preserved for indexing in all embodiments of the invention.

Index Construction

Following the teaching of U.S. Pat. No. 6,058,392, the canonical records are indexed by episode to create an index consisting of episodic signatures. The index can be searched by individual transition, the number of identical combinations of transitions, length of combinations of transitions, by individual occurrence or instance of a web page, sequentially by a specific pattern of transition, or in any other manner consistent with the indices created.

Figure 1:
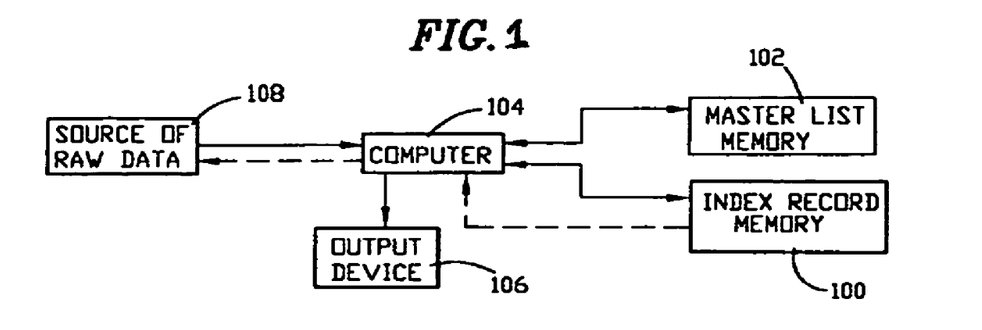
FIG. 1 shows a block diagram of the apparatus of the present invention.

In FIG. 1 there is shown a block diagram of an apparatus for performing the method of creating the indices of the present invention. The apparatus includes a computer 104, which can be a general-purpose computer or any other device with the capacity to process information as disclosed herein. The computer 104 interfaces with a variety of data sources; however, those of ordinary skill in the art will understand that the representation in FIG. 1 is conceptual rather than physical. Thus, the data sources can come from a single computer/data device or from a plurality of such devices.

A source of raw data 108, such as another computer program or data transmission from another computer or peripheral data source, has an output connected to an input of the computer 104. Also, it is possible to communicate information from the computer 104 to the raw data source 108. The raw data source 108 may include a Master List of items appearing in the information being processed. The computer 104 reads the raw data from the source 108 and processes that information to create the indices of the present invention. These indices include the Master List, which is output to a Master List Electronic Storage 102, and one or more index records output to an Index Record Electronic Storage 100. In order to reduce computational demand, the Master List need not be created each time and can be stored and used directly or updated as needed when new records are encountered.

The computer 104 reads the raw data from the data source 108. The computer 104 can identify the unique set of items associated with the raw data, and create the indices of the present invention. An output device 106, such as a printer or a CRT, also is connected to the computer 104 for generating output information related to the index.

Figure 2:
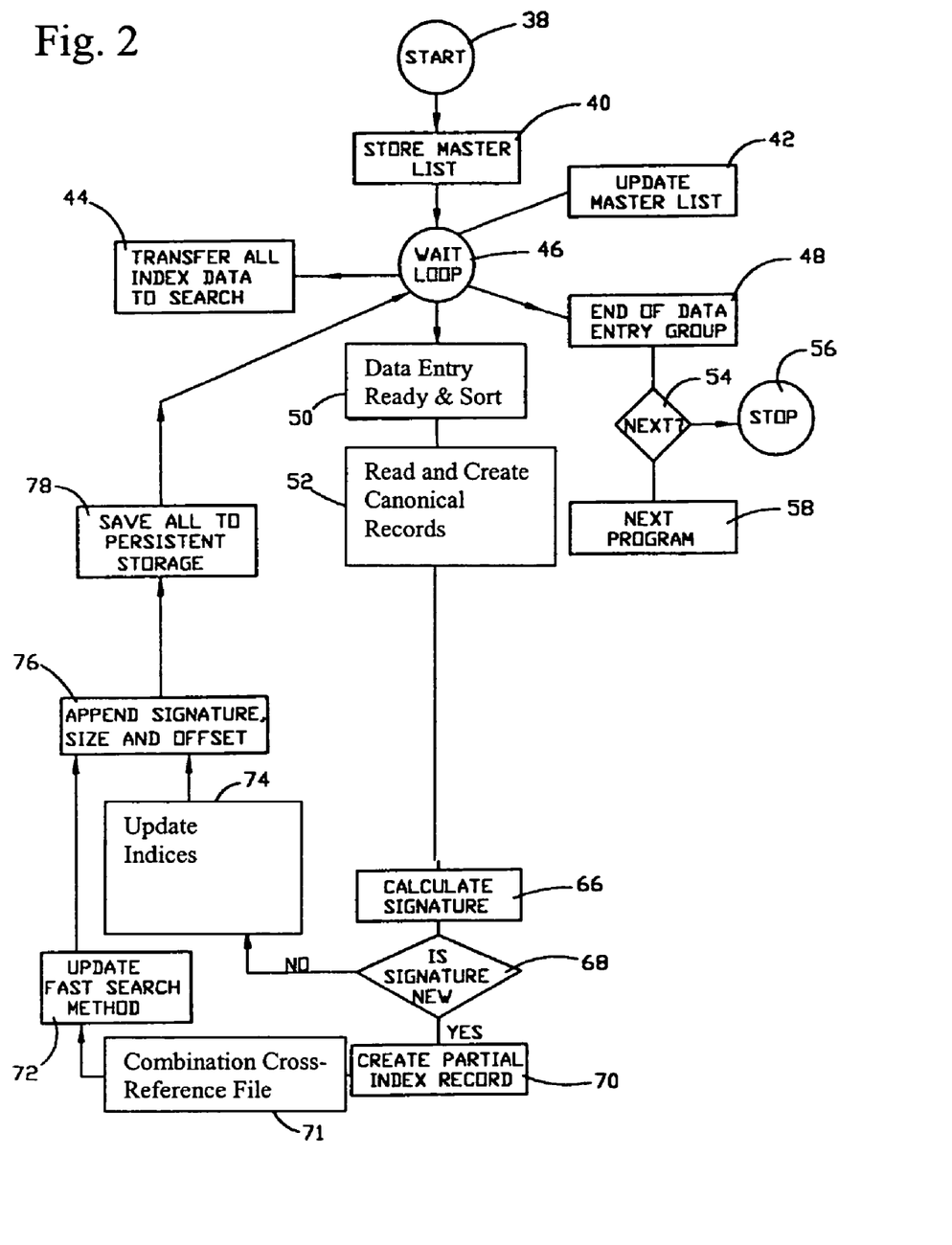
FIG. 2 is a flow chart of the method of the present invention.

FIG. 2 shows the method of data classification of the present invention embodied in the following steps preformed by the computer 104 under the control of a computer controlled program means located within the computer 104. First, the method of the present invention begins with the start step 38, and then proceeds to the store Master List step 40. In the store Master List step 40 the Master List is created/stored to electronic storage. The Master List is a list of all of the Path Locations, or in the preferred embodiment the URLs, accessed by a user or by a plurality of users and the Sequence Numbers used to generate the Transition IDs created using the positional algorithm described hereinabove. As indicated hereinabove, the URL or Path Location information can sometimes be quite lengthy and difficult to store in its unadulterated form. Thus, it is helpful to convert the URLs to a shortened unique Caption. The basic Master List has the following structure.

Figure 3:
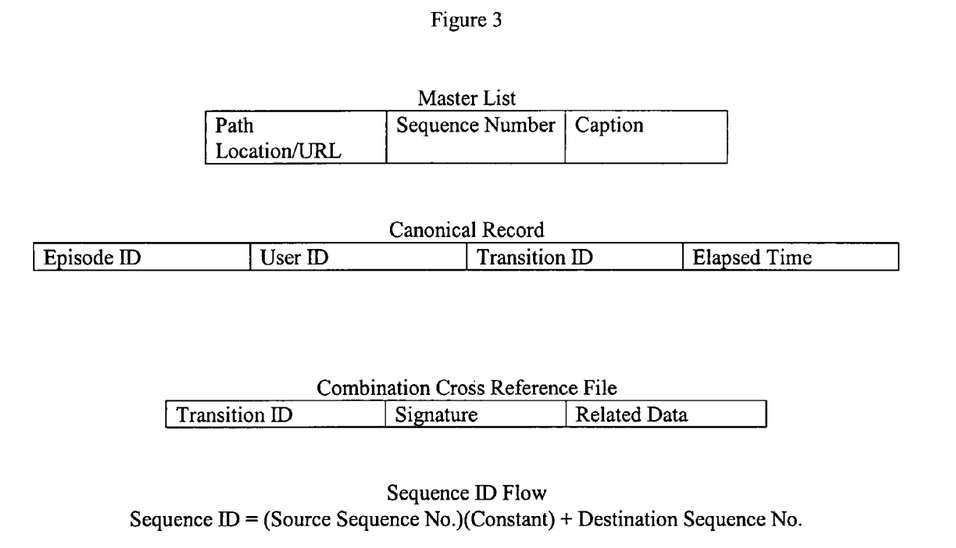
FIG. 3 is a block diagram and flow chart of various parts of the present invention.

| Master List | | |
|---|---|---|
| Path Location/URL | Sequence Number | Caption |

Again, this information can be gained originally from the raw data, or stored and recalled and new search key fields appended if necessary. In any event, the Master List will contain one record for each Path Location, or URL in the preferred embodiment, traveled to by the user or users. Upon construction of the indices of the present invention, the information in the Master List functions as search sort keys for use by search algorithms, and in particular by fast search and retrieval methods due to the fact that the records are of fixed length.

Next, program control passes to the Wait Loop step 46. At this point program control can branch to either the Update Master List step 42, or to the End of Data Entry step 48, or to the Data Entry Ready and Sort step 50, or to the Transfer all Index Data to Search step 44. Following program control to the Data Entry Ready and Sort step 50, this step initiates/continues the process of constructing the indices of the present invention, and performs the aforementioned sorting step to group together the activity of each user. The data should be sorted by user IP address, which results in all records of a particular user being written in time sequence.

The next step of the process consists of the Read and Construct Canonical Record step 52. In this step the computer reads raw data from the logged data record source 108, wherein the data comprises the computerized representation of events, transactions, cases, occurrences, episodes, or the like. However, the computer 104 can read summaries, where the summaries originally came from separate data streams. The Read and Construct Canonical Record step 52 is performed on one logged record from the data source 108 at a time. The computer 104 reads the data from the raw data source 108 one record at a time. The episodes recorded on the raw data source 108 comprise at least one transition including one transition record, or the data equivalent thereof, and in most cases comprises a number of transitions. Thus, in the Read and Construct Canonical Record step 52, the computer 104 reads one or more records from the data stream, which represent at least one episode of network path travel. Further, the data from the data stream contains information by which the Episode ID, User ID, Transition ID, and Elapsed Time can be determined or given. Also, a Transition Number representing the total number of transitions within an episode is tallied. Additionally, an Episode ID Marker that allows for locating, and preferably determining the size of, the episode within the data stream is also recorded.

Next, program control transfers to the Calculate Signature step 66. In this step a signature function is applied to the complete array of transition information for an episode. In particular, the Signature comprises a coded representation of the transitions in an episode. The Transition IDs in the ordered Canonical Records have preserved the order of transitions, a signature function encodes in order of travel a record of all transitions in an episode. The signature function comprises a function in which minor differences in input produce major differences in output. The signature function produces a fixed length coded equivalence amenable to use by fast search algorithms, usually in the form of a binary number. Preferably, the Signature is created from the Transition IDs.

Next, program control transfers to the Signature New step 68. In this step, the computer searches for any prior occurrences of the just created signature. If this instance of the signature comprises the first occurrence of the signature, program control transfers to the Create Partial Index Record step 70.

The Create Partial Index Record is as follows.

| Partial Index Record | | | |
|---|---|---|---|
| Pointer | Signature | Transition Number | Count |

Each instance of the Partial Index Record includes a Signature, and the Transition Number associated with the given Signature which represents the number of transitions in the episode represented by the Signature. A Pointer is also included that points to the first record within a Combination Cross-Reference file (described in detail hereinbelow) that contains the same Signature. Additionally, the Partial Index Record can include a Count that represents the total number of occurrences of the present instance of the Signature within the overall data stream. In other words, if this is the first occurrence of the Signature the count would equal 1, subsequently the fifth occurrence of the Signature the count would equal 5, and so forth. Since the presently created Signature, or occurrence of the Signature, does not exist in any of the Partial Index Records, the computer appends a new record onto the Partial Index Record containing the new Signature.

Next, program control transfers to the Combination Cross Reference File step 71. In this step 71 a record is added to the Combination Cross-Reference file. The records of this file appear as follows.

| Combination Cross Reference File | | |
|---|---|---|
| Transition ID | Signature | Related Data |

The Combination Cross Reference File includes the Transition ID, Signature, and any Related Data. The Combination Cross Reference File contains a series of records that document each occurrence of each Transition ID in each Signature. For example, if a first Signature results from application of the signature function to an episode comprised of four Path Transition IDs, then the Combination Cross Reference File would contain four records—one record for each Transition ID, and each record would have the same Signature. If a second Signature resulted from the application of the signature function to an episode containing three Transition IDs the Combination Cross Reference File would contain three records for that second Signature. In this manner, the Combination Cross Reference Rile would contain a record for every occurrence of a Transition ID within every Signature in which the Transition ID appears within the data stream. An additional Related Data field is included in the Combination Cross Reference File to allow including any data attribute of significance to the particular Transition ID, Signature, or episode. For example, the related data could include the date and time, or information about sorting, adjusts to the tally, or anything else of relevance.

Following this step, program control transfers to the Update Fast Search Method step 72. In this step necessary information, including index information, is provided for use by the fast search method for subsequent use in searching the indices. The information inserted includes at least the Signatures and a means for locating the first occurrence of the Signatures in the Partial Index Record. This information can be provided by any conventional means, for example by supplying a pointer.

Returning now to the is Signature New step 68, if the Signature is not new then program control transfers to the Update Indices step 74. In this step, if the Combination Cross Reference file does contain any Related Data for the particular Signature, or new Related Data needs to be added, then the Related Data is added the appropriate records of the Combination Cross Reference File. Additionally, the Master List is prepared for searching. In practice, the Master List is maintained in two different sequences: (1) the primary Master List is kept in a sequence of first encounter, that is each new item is appended to the end of the list as it is encountered, and for internal processing is comprised of the Path Location/URL, Sequence Number, and Caption, and it is this version of the Master list that is used for indexing and searching purposes; (2) a separate Master List is maintained in alphanumeric order sorted by the Caption field, this version is used for display purposes by the graphical user interface. In practice, to easily identify the beginning of the Master Lists for coding purposes, an arbitrary value (!EXIT) is stored as the first record in the Master Lists. The value sorts to the index zero location in the alphanumeric list and is placed in the same location of the full Master List.

Additionally, other adjustments to can be made at this time if desired or needed. For example, a high and/or low value such as elapsed time between points of a transition, and other information can be appended to the Partial Index Record. At this point in the process, since the Signature is not new the Count associated with the particular Signature in the Partial Index Record requires incrementing. In other words, due to the fact that each Signature appears only once in the Partial Index Record, the Count records the number of times a particular Signature occurs within the data stream. Thus, every time a Signature reappears the Count requires incrementing to accurately reflect the total number of occurrences of each Signature.

The next step in the method comprises the Append Signature, Size, and Offset step 76. In this step, a record is appended to a Raw Data Index, of the following form.

| Raw Data Index | |
| --- | --- |
| Signature | Marker |

Each record in the Raw Data Index includes a Signature and a Marker relating to that signature. The Raw Data Index captures the occurrence of every Signature, and the Marker allows for determining the size and location of the raw data represented by the Signature Next, computer program control passes to the Save All to Persistent Storage step 78. In this step all of the aforementioned indices are saved to an Index Record Electronic Storage 100, shown in FIG. 1.

Program control then passes to the Wait Loop 46, where several possible actions may result. In the situation where the Master List does not already exist in persistent electronic storage or if new information has been processed, program control transfers to the Update Master List step 42. In this step, any Transition ID not already present in the Master List is appended thereto.

On the other hand, program control could return to the Data Entry Ready step 50 for processing the next episode within the data stream. After processing all of the episodes, program control would transfer from the Wait Loop 46 to the End of Data Entry step 48. At this point program control transfers to the Next step 54, at which point computer control either branches to the Stop step 56 or to the Next Program step 58.

Finally, computer program control can branch from the Wait Loop 46 to the Transfer All Index Data to Search step 44. This step 44 signifies the end of the load phase and the beginning of the search phase of the present invention.

The Search Phase

In the search phase conventional public domain fast search methods, and the like, can operate upon the indices created in the load phase to compile reports, identify the existence of particular conditions within the data, or any number of operations based on index searching. Those skilled in the art will realize that the search phase can utilize several distinct fast search methods including B+ Tree, or ISAM. ISAM comprises a public domain method for finding computerized information that utilizes an indexing system to sequentially order the data to conventionally point to a specific area within the data based on a predetermined criteria. The configuration of indices created during the load phase enables data pattern searching based on the fixed length Signatures and the constituent Transition IDs. In this manner, the indices convert the episodes to fixed length records within the Partial Index Record, the Combination Cross Reference file, the Raw Data Index, and the Master List. This enables use of fast search methods that only operate on fixed length records. This innovation of the present method allows application of the invention to virtually unlimited types of data, and virtually unlimited indexing organizations.

For example, to search the indices by a Signature simply requires identifying the particular Signature desired within the Partial Index Record. The Partial Index Record reveals the Transition Number of the Signature, and the Count. This information reveals the number of transitions in the episode represented by the Signature and the number of times the Signature occurs within the data stream. Additionally, a Pointer points to the location of the Signature within the Combination Cross-Reference file. Upon location of the signature within the Combination Cross-Reference file a search quickly reveals all of the component Transition ID information. The From/To URL information can be retrieved by reversing the positional algorithm and consulting the Master List. Further information about the Signature results by locating the Signature within the Raw Data Index. In this manner, the search can reveal the location of every occurrence with a particular Signature.

A search to locate a particular Path Location/URL in a Signature proceeds by first obtaining the Sequence Number from the Master List for the given Path Location/URL. The Sequence Number can occur as a From or To URL in one or more Transition IDs. Using the positional algorithm it can be determined which Signature(s) contain(s) the Sequence Number by searching the Combination Cross Reference File. Once identified, further information about the Signature(s) can be found in the Partial Index Record, and the Raw Data Index.

The indexing according to the present invention also allows supplemental searching based on subsets of the Signature. For example, a search to reveal the occurrence of a Transition ID within any Signature would proceed according in the following manner. First, additional indices are created. One of which, comprises an Inverted Combination Cross-Reference file, which comprises the Combination Cross-Reference index sorted by Transition ID. Of course, those skilled in the art will realize that several other indices can be created, and will be useful for specific search purposes. For example, the Master List can be searched to locate any given Path Location/URL and its corresponding Sequence Number. Furthermore, the Sequence Number, and any Transition IDs including a particular Sequence Number, can be used to identify patterns of usage by locating the Signatures that the Transition ID appears in the Inverted Combination Cross-Reference file. Additionally, in a similar manner, searches can proceed by re-ordering the Partial Index Record by Transition Number, or Count.

Consequently, the indexing scheme of the present invention allows tremendous flexibility in structuring searches, and classifies the data in a manner to quickly retrieve information and data based on a nearly unlimited combination of search sort keys.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing form the scope of the invention.

We claim:

1. A computerized method for indexing network path traversal information, comprising:
    providing a general-purpose computer in operative communication with a data stream for performing the steps of the method;
    reading data from said data stream wherein said data stream is formatted into one or more canonical records comprised of a source and destination network path transversal;
    creating a transition record from said data of said data stream wherein said data is a record of movement between said source and destination;
    repeating said reading and creating steps for a plurality of transition records that represent at least one episode in said data stream;
    creating a network path transversal information index therefrom;
    creating a transition id for each of said transition records representing said network path transversal; and
    creating a signature from said transition id information, wherein said signature represents the transitions within said episode.

2. The method in accordance with claim 1 wherein said index is a partial index record comprised of said signatures, transition numbers representing the number of said transitions in said episodes represented by said signatures, and counts representing the total number of occurrences of said signatures within said data stream.

3. The method in accordance with claim 2 further comprising a combination cross reference index comprising said signatures, and a record of each of said transitions within each of said signatures, and said partial index record further comprises a pointer to the first occurrence of said signatures within said combination cross reference index.

4. The method in accordance with claim 1 wherein said index is a combination cross reference index comprising said signatures, and a record of each of said transitions within said signatures.

5. The method in accordance with claim 4 wherein said combination cross reference index further comprises related data field for recording information related to said signatures and/or said transitions within said signatures.

6. The method in accordance with claim 1 wherein each point in the network is assigned a sequence number.

7. The method in accordance with claim 6 further comprising a master list comprised of a listing of each of said points in the network and sequence numbers corresponding thereto.

8. The method in accordance with claim 7 wherein said master list is comprised of a first master wherein said elements of said master list are in a sequence of first encounter, and a second master list wherein said elements of said master list are arranged in alphanumeric order.

9. The method in accordance with claim 1 further comprising a raw data index comprised of said signatures and markers locating data in electronic storage from which said signatures are composed.

10. The method in accordance with claim 1 wherein said canonical record further comprises an elapsed time for said source and destination network path transversal.

11. The method in accordance with claim 1 wherein said canonical record further comprises an episode id, to identify said episode.

12. The method in accordance with claim 1 wherein said episodes represent network path transversals of a global computer information network.

13. The method in accordance with claim 1 wherein said transition id is comprised of source sequence number and a destination sequence number representing said points on the network path, and said transition id is encoded by multiplying said source sequence number by a large constant and said destination sequence number is added thereto.

14. A computerized method for indexing network path traversal information, wherein movement within the network in comprised of one or more transitions within an episode which is comprised of all transitions over a particular or defined period of time or associated with a particular user, comprising:
    providing a general-purpose computer in operative communication with a data stream for performing the steps of the method;
    reading data from said data stream, wherein said data is formatted into one or more canonical records comprised of a source and destination network path transversal from which a transition within an episode is comprised, an elapsed time for said source and destination network path transversal, an episode id, to identify said episode, a file displacement for locating in electronic storage the information from which said canonical record is composed
    encoding said transitions are into transition ids, wherein said transition is comprised of source number and a destination number representing points on the network path, and said numeric equivalent is encoded by multiplying said source number by a large binary constant and said destination number is added thereto;
    creating a signature for said episode within said data stream, wherein said signature is a representation of said transitions;
    repeating said reading and creating steps for a plurality of episodes in said data stream; creating a partial index record comprised of said signatures, transition numbers representing the number of said transitions in said episodes represented by said signatures, a pointer to the first occurrence of said signatures within a combination cross reference index, and counts representing the total number of occurrences of said signatures within said data stream;
    creating a combination cross reference index comprising said signatures, a record of each of said transitions within said signatures, and a related data field for recording information related to said signatures and/or said transitions within said signatures;
    creating a first master comprised of a listing of each of said transitions and said transition ids corresponding thereto, wherein said elements of said first master list are in a sequence of first encounter;
    creating a second master list comprised of a listing of each of said transitions and said transition ids corresponding thereto, wherein said elements of said second master list are arranged in alphanumeric order;
    creating a raw data index comprised of said signatures and markers locating data in electronic storage from which said signatures are composed.

* * * * *